United States Patent
Pyo et al.

(10) Patent No.: US 8,874,128 B2
(45) Date of Patent: Oct. 28, 2014

(54) METHOD AND SYSTEM FOR DETECTING A LOCATION OF A MOBILE COMMUNICATION TERMINAL

(75) Inventors: Jong-Sun Pyo, Suwon-si (KR); Chin-Kyu Kang, Suwon-si (KR); Young-Rae You, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 447 days.

(21) Appl. No.: 12/462,102

(22) Filed: Jul. 29, 2009

(65) Prior Publication Data

US 2010/0029301 A1   Feb. 4, 2010

(30) Foreign Application Priority Data

Jul. 31, 2008  (KR) .................... 10-2008-0075153

(51) Int. Cl.
*H04W 24/00* (2009.01)
*H04W 64/00* (2009.01)

(52) U.S. Cl.
CPC .................................. *H04W 64/003* (2013.01)
USPC ................... 455/456.1; 455/443; 455/448

(58) Field of Classification Search
USPC ............................. 455/432.1–433
See application file for complete search history.

(56) References Cited

U.S. PATENT DOCUMENTS

| | | | |
|---|---|---|---|
| 6,603,976 B1 * | 8/2003 | Amirijoo et al. | 455/456.1 |
| 2003/0040323 A1 * | 2/2003 | Pihl et al. | 455/456 |
| 2003/0148774 A1 | 8/2003 | Naghian et al. | |
| 2004/0203880 A1 * | 10/2004 | Riley | 455/456.1 |
| 2006/0217130 A1 * | 9/2006 | Rowitch et al. | 455/456.1 |
| 2013/0009810 A1 | 1/2013 | Rowitch et al. | |

FOREIGN PATENT DOCUMENTS

| | | |
|---|---|---|
| KR | 100631867 B1 | 10/2006 |
| KR | 20070121794 A | 12/2007 |

OTHER PUBLICATIONS

Korean Examination Report dated Jul. 25, 2014 in connection with Korean Patent Application No. 2008-0075153, 7 pages.

* cited by examiner

*Primary Examiner* — Vladimir Magloire (57) ABSTRACT

A system and method for detecting a location of a mobile communication terminal. A mobile communication network for communication with the terminal and a cell identifier (ID) of a base station is set. A public land mobile network (PLMN) ID of the network and the cell ID are stored. One or more networks other than the set network are searched for. When the one or more other networks are searched for, the searched one or more other networks are sequentially set. Cell information according to the one or more other networks is searched for. Cell IDs of base stations communicable with the terminal are set. PLMN IDs of the one or more other networks and the cell IDs are stored. A common area between cells set using the stored PLMN and cell IDs is determined. Information about the common area is detected as location information of the terminal.

14 Claims, 9 Drawing Sheets

| MCC1 | MNC1 | LAC1 | RAC1 |
|------|------|------|------|
| MCC2 | MNC2 | LAC2 | RAC2 |
| MCC3 | MNC3 | LAC3 | RAC3 |
| ... MCCx | ... MNCx | ... LACx | ... RACx |

| INDEX | PLMN, LAC | POI NAME | POI CATEGORY | LOCATION | TELEPHONE NUMBER |
|---|---|---|---|---|---|
| 1 | PLMN1, LAC1 PLMNx, LACx | ARAL | Gas Station | 52.xx, 10.xx | 54-33-22-72 |
| 2 | PLMN1, LAC1 PLMNx, LACx | Green dinner | Restaurant | 52.xx, 10.xx | 54-33-36-20 |
| ... | | | ... | | |
| n | PLMN3, LAC3 PLMNx, LACx | ARAL | Gas Station | 52.xx, 10.xx | 54-33-36-20 |

| INDEX | PLMN, LAC | LINK ID | ATTRIBUTE | TYPE LIST |
|---|---|---|---|---|
| 1 | PLMN1, LAC1 PLMNx, LACx | 0x11 | Highway Bidirection | xxxx |
| 2 | PLMN2, LAC2 PLMNx, LACx | 0x22 | xxxx | xxxx |
| ... | | | ... | |
| n | PLMN3, LAC3 PLMNx, LACx | 0x33 | xxxx | xxxx |

METHOD AND SYSTEM FOR DETECTING A LOCATION OF A MOBILE COMMUNICATION TERMINAL

CROSS-REFERENCE TO RELATED APPLICATION(S) AND CLAIM OF PRIORITY

The present application claims the benefit under 35 U.S.C. §119(a) of a Korean Patent Application filed in the Korean Intellectual Property Office on Jul. 31, 2008 and assigned Serial No. 10-2008-0075153, the disclosures of which are incorporated herein by reference.

TECHNICAL FIELD OF THE INVENTION

The present invention relates generally to a method and system for detecting a location of a mobile communication terminal.

BACKGROUND OF THE INVENTION

As the use of a mobile communication terminal and a navigation terminal is generalized, various applications and equipments for Location-Based Services (LBS) are being developed and their demands are continuously increasing.

In a mobile communication terminal using a mobile communication network, its own location can be detected using cell information of a base station for performing communication at present. In order to detect a location using information of a cell where the mobile communication terminal is located as described above, the mobile communication terminal sets up Public Land Mobile Network (PLMN) and cell Identifiers (IDs) of a mobile communication system.

Figure 1:
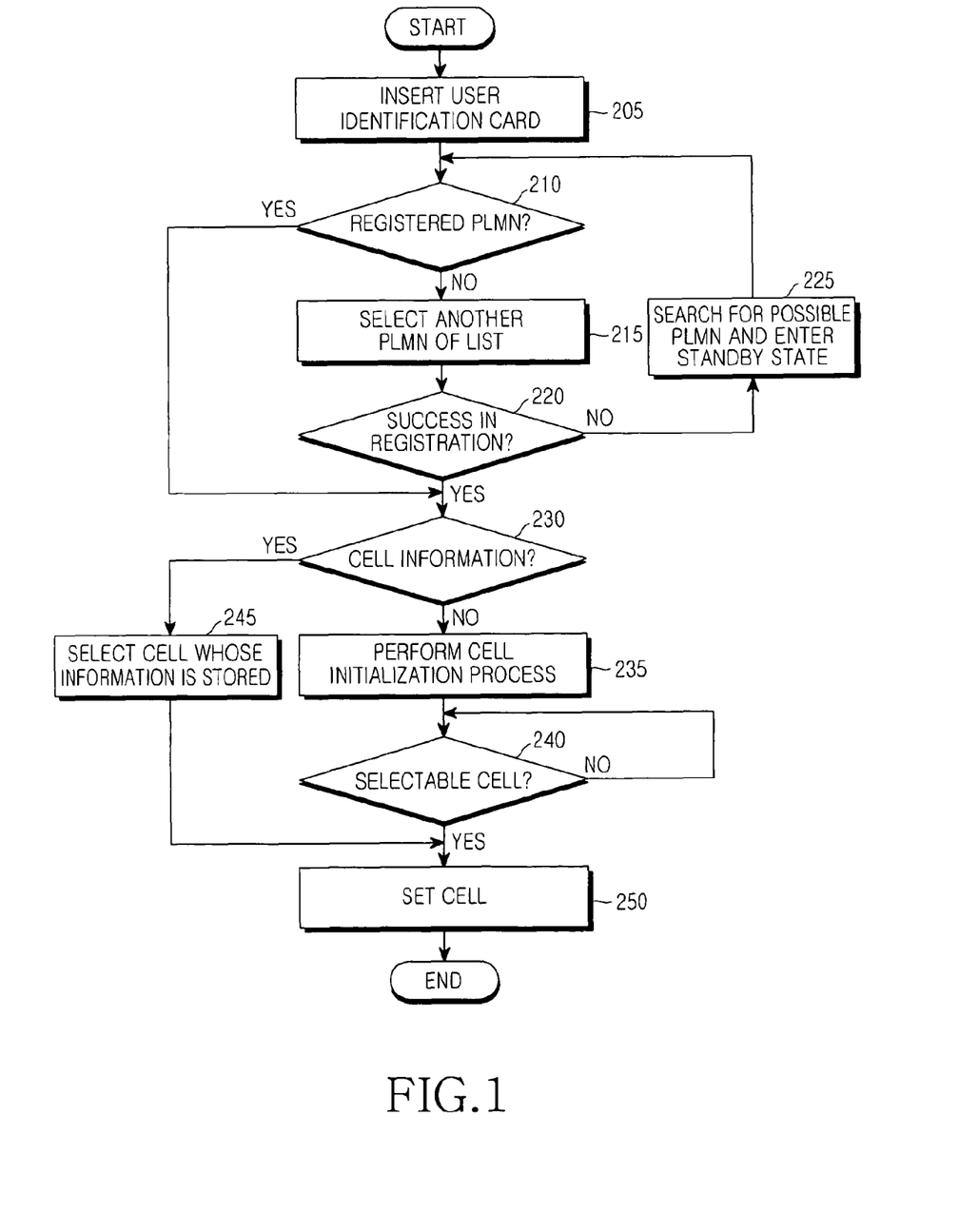
FIG. 1 illustrates a flowchart for a conventional operation for setting PLMN and cell IDs in a mobile communication system.

FIG. 1 illustrates a flowchart for an operation for setting PLMN and cell IDs in a conventional Wideband Code Division Multiple Access (WCDMA) mobile communication system. A user identification card such as a Universal Subscriber Identity Module (USIM) is inserted into a mobile communication terminal in step 205. Then, in step 210, it is determined whether a PLMN registered according to the user identification card exists. When no registered PLMN exists as the determination result of step 210, the operation proceeds to step 215 to attempt to select and register another PLMN of a list. Then, in step 220, it is determined whether the registration of the other PLMN of the list succeeds. When the registration of the other PLMN of the list fails, registration is attempted using all other PLMNs of the list. When the registration of all the other PLMNs of the list fails in step 220, the operation proceeds to step 225 to search for a possible PLMN and enter a standby state. When a preset specific situation occurs, the operation proceeds to step 210 to re-attempt to register a PLMN.

When the PLMN registration succeeds in step 210 or 220, the operation proceeds to step 230 to determine whether cell information exists. When the cell information exists in step 230, the operation proceeds to step 245 to select a cell whose information is stored and then proceeds to step 250 to set up the selected cell.

When the cell information does not exist in step 230, the operation proceeds to step 235 to perform a cell initialization process and then proceeds to step 240 to determine whether a selectable cell exists. When the selectable cell exists, the operation proceeds to step 250 to select and set up the cell. When the selectable cell does not exist in step 240, the operation is in the standby state.

By performing the above-described operation, the mobile communication terminal may perform communication by setting up a PLMN and a cell and detect its own location using registered PLMN and cell information. Conventionally, the mobile communication terminal uses PLMN and cell IDs transmitted on a Broadcasting Channel (BCCH) of a base station as information to be stored or utilized to detect its own location. Accordingly, the mobile communication terminal may detect rough location information using the cell information. In this location detection method, location detection is possible in a range of about 3 Kilometers (Km) in the case of a cell of a city center area and in a wider range in the case of a cell of an outer area.

A method for detecting a location using cell information of the mobile communication network has a problem in that only rough location information may be detected since a range of the detected location information is wide. Thus, a location detection method capable of acquiring an exact location detection result of a more precise range is needed.

SUMMARY OF THE INVENTION

To address the above-discussed deficiencies of the prior art, it is a primary object to provide a method and system for exactly detecting location information of a more precise range when a location is detected using information of a cell where a mobile communication terminal is located.

According to one aspect of the present invention, a method is provided for detecting a location of a mobile communication terminal, including: setting a mobile communication network for communication with the mobile communication terminal and a cell ID of a base station and storing a PLMN ID of the mobile communication network and the cell ID; searching for one or more mobile communication networks other than the set mobile communication network; sequentially setting, when the one or more other mobile communication networks are searched for, the searched one or more other mobile communication networks, searching for cell information according to the set one or more other mobile communication networks, setting cell IDs of base stations communicable with the mobile communication terminal, and storing PLMN IDs of the set one or more other mobile communication networks and the set cell IDs; and determining a common area between areas of a plurality of cells set using the stored PLMN and cell IDs and detecting information about the common area as location information of the mobile communication terminal.

According to another aspect of the present invention, a system is provided for detecting a location of a mobile communication terminal, including: the mobile communication terminal for setting a mobile communication network for communication and a cell ID of a base station, storing a PLMN ID of the mobile communication network and the cell ID, searching for one or more mobile communication networks other than the set mobile communication network, sequentially setting, when the one or more other mobile communication networks are searched for, the searched one or more other mobile communication networks, searching for cell information according to the set one or more other mobile communication networks, setting cell IDs of base stations communicable with the mobile communication terminal, and storing PLMN IDs of the set one or more other mobile communication networks and the set cell IDs; and a location computing unit for receiving the stored PLMN and cell IDs from the mobile communication terminal, determining a common area between areas of a plurality of cells set using the stored PLMN and cell IDs, and detecting information about the common area as location information of the mobile communication terminal.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, the same drawing reference numerals will be understood to refer to the same elements, features and structures.

DETAILED DESCRIPTION OF THE INVENTION

FIGS. 2 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

The present invention provides a technology for detecting a location using every information of a corresponding cell, intersected with a plurality of PLMNS, where a mobile communication terminal is located by searching for the PLMNs whose information is included in a BCCH and utilizing and storing unregistered PLMN and cell IDs except registered PLMN and cell IDs when the location is detected using the information of the cell where the mobile communication terminal is located.

Figure 2:
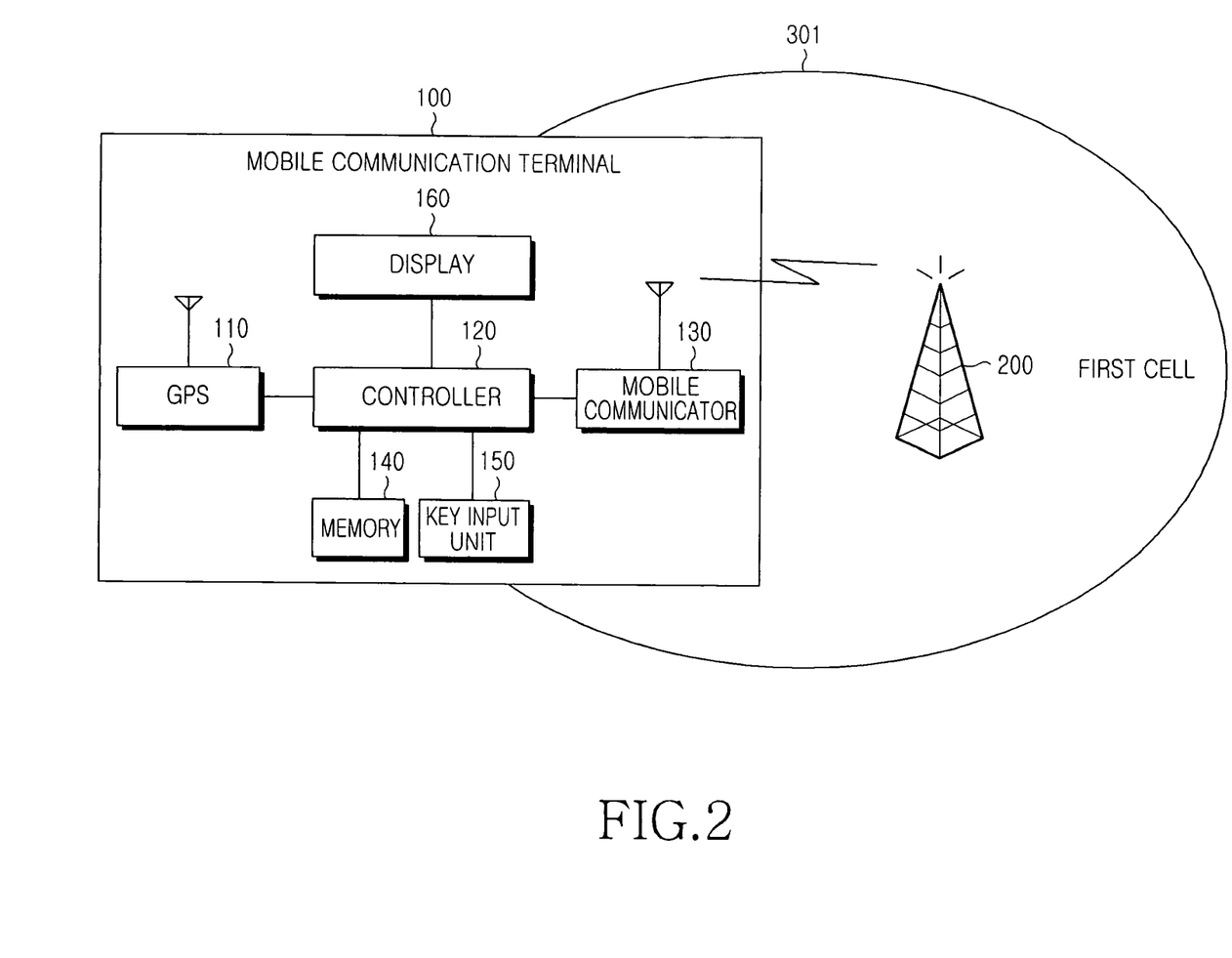
FIG. 2 illustrates an example block diagram of a mobile communication terminal to be used in the present invention.

FIG. 2 illustrates an example block diagram of a mobile communication terminal to be used in the present invention. A structure of a mobile communication terminal 100 to which the present invention is applied includes a Global Positioning System (GPS) module 110, a controller 120, a mobile communicator 130, a memory 140, a key input unit 150, and a display 160.

The controller 120 controls an overall operation of the mobile communication terminal 100.

Under control of the controller 120, the display 160 displays various image information and data and images received from a base station 200 or stored in the memory 140 on a screen.

The key input unit 150 includes * and # keys and a plurality of function keys of Menu, Select, Call, Delete, Power/End, Volume, Capture, and the like, corresponding to various functions of the mobile communication terminal, and provides the controller 120 with key input data corresponding to a key pressed by a user. The key input unit 150 includes alphanumeric keys to which numbers of '0' through '9' and Korean or English letters are allocated.

Under the control of the controller 120, the GPS module 110 receives a GPS signal. The GPS module 110 computes a current location using the received GPS signal, and computes various data required for performing a navigation function, by interfacing with the controller 120 and the memory 140.

Under the control of the controller 120, the mobile communicator 130 performs an operation and signal processing required for mobile communication. The mobile communicator 130 transmits a radio signal to, and receives a radio signal from, a mobile communication base station 200 via an antenna. The mobile communicator 130 modulates a transmission radio signal input from the controller 120 through a baseband processor and transmits the radio signal via the antenna. Also, the mobile communicator 130 demodulates a radio signal received via the antenna and provides the radio signal to the controller 120 through the baseband processor. The baseband processor processes a baseband signal transmitted/received from the controller 120. The mobile communicator 130 always changes a state on downlink/uplink with the base station 200. In this case, the state is controlled by reporting the state to the controller 120. The controller 120 holds information about the base station 200 connected to the mobile communicator 130, that is, a base station of a service cell, and information about a neighboring base station. The information is a cell ID corresponding to a base station ID. A service cell ID and a neighboring cell ID are received by the base station of the service cell. Hereinafter, in an exemplary embodiment of the present invention, a cell having a service area including a point at which the current mobile communication terminal 100 is located is referred to as the service cell.

The cell ID is allocated as a result of cell planning to control the coverage of each region in a mobile communication system and is designed to support the entire city and country. A service area of one cell has a communication radius of, for example, about 1~2 Km in a city center area or about 3~5 Km in an outer area.

Figure 3:
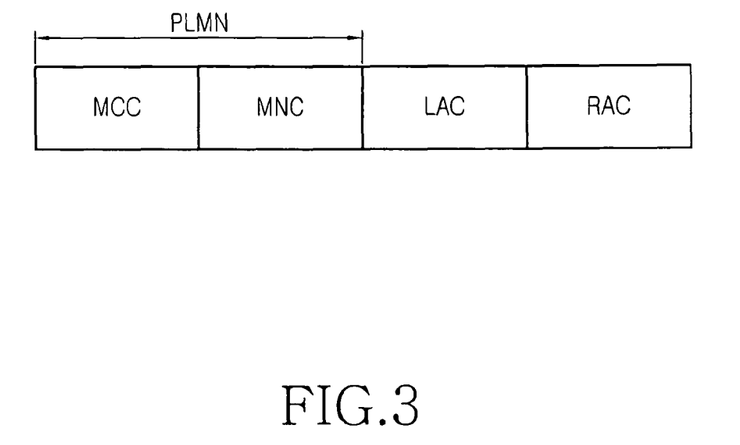
FIG. 3 illustrates a structure of a BCCH.

FIG. 3 illustrates a structure of a BCCH. The BCCH includes a Mobile Country Code (MCC), a Mobile Network Code (MNC), a Location Area Code (LAC), and a Routing Area Code (RAC). The MCC is a country code that can have a value such as, for example, "England 234". The MNC is a network code that can have a value such as, for example, "Vodafone 15". The MCC and MNC are determined according to a PLMN. The LAC is a cell ID of a base station. A LAC value is set differently according to a base station.

Figure 4:
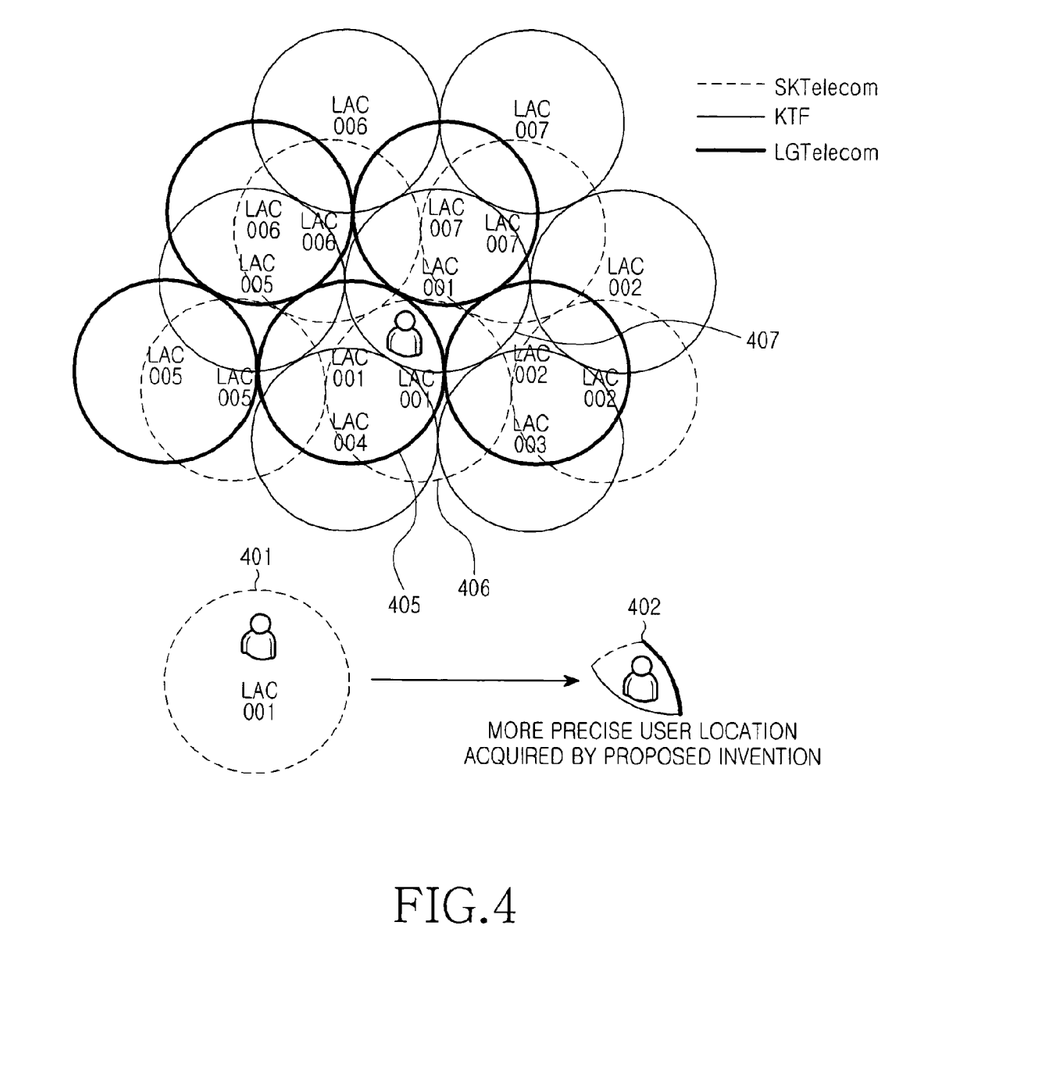
FIG. 4 illustrates an operation concept of detecting a location of the terminal using PLMN and location area code values according to an exemplary embodiment of the present invention.

FIG. 4 illustrates an operation concept of detecting a location of the terminal using a plurality of PLMN values and a plurality of LAC values according to an exemplary embodiment of the present invention. As illustrated in FIG. 4, when the terminal is located in a cell corresponding to "LAC 001" of a first PLMN (for example, SK Telecom (SKT) communication network), a conventional method can detect only location information indicating a range of the cell of "LAC 001" of the first PLMN. However, since the location information is detected using all of a second PLMN (for example, Korea Telecom Freetel (KTF) communication network), a cell where the terminal is located in the second PLMN, a third PLMN (for example, LG Telecom (LGT) communication network), and a cell where the terminal is located in the third PLMN according to a feature of the present invention, the location information of the current mobile communication terminal can be detected by computing location information of an area intersected with the three cells.

For example, as illustrated in FIG. 4, the current mobile communication terminal is simultaneously located in the cell corresponding to "LAC 001" 405 of the first PLMN, in the cell corresponding to "LAC 001" 406 of the second PLMN, and in the cell corresponding to "LAC 001" 407 of the third PLMN. A location information result having a range indicated by reference numeral 401 is acquired in the conventional method, but an exact location information result having a range indicated by reference numeral 402 is acquired using a plurality of PLMN values and a plurality of LAC values according to an exemplary embodiment of the present invention.

Figure 5:
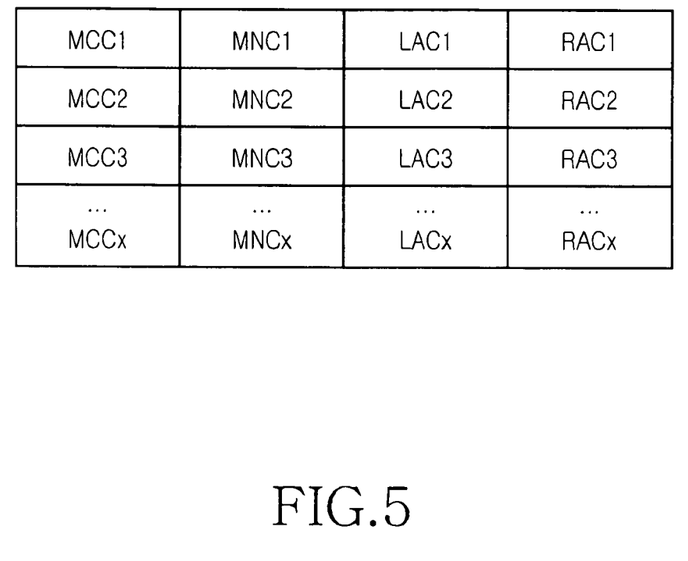
FIG. 5 illustrates an example in which a plurality of PLMN values and a plurality of LAC values are stored in the mobile communication terminal according to an exemplary embodiment of the present invention.

FIG. 5 illustrates an example in which a plurality of PLMN values and a plurality of LAC values are stored in the mobile communication terminal according to an exemplary embodiment of the present invention. A mobile communication terminal conventionally stores one PLMN value and one LAC value. However, as illustrated in FIG. 5, the mobile communication terminal stores a plurality of PLMN information elements capable of being set by the mobile communication terminal and cell information elements (LACs) corresponding to the PLMNs according to an exemplary embodiment of the present invention. The information of PLMNs and cells can be searched for and set by the mobile communication terminal.

Figure 6:
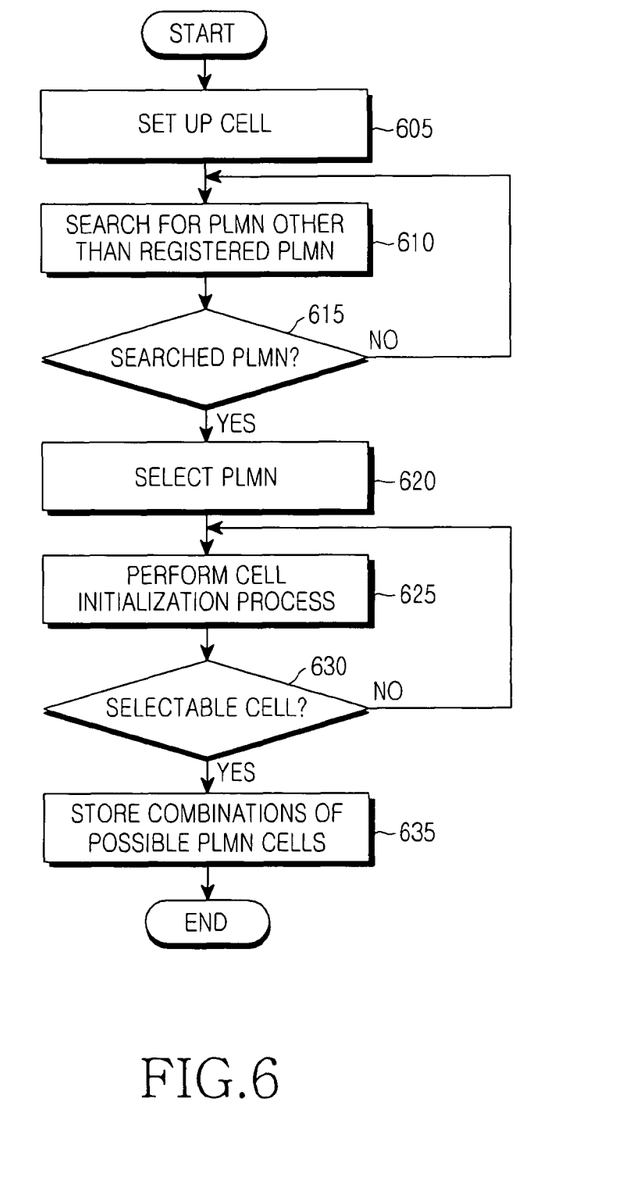
FIG. 6 illustrates a flowchart for an operation for storing PLMN and cell IDs according to an exemplary embodiment of the present invention.

FIG. 6 illustrates a flowchart for an operation for storing PLMN and cell IDs according to an exemplary embodiment of the present invention. In step 605, a cell is set up by performing a process for setting existing PLMN and cell IDs. In step 610, a neighboring PLMN other than a registered PLMN is additionally searched for. In step 615, it is determined whether the searched PLMN exists. When no searched PLMN exist in step 615, a PLMN is periodically searched for in step 610.

When the searched PLMN exists in step 615, the operation proceeds to step 620 to select the searched PLMN. In step 625, a cell initialization search process is performed for a cell of the selected PLMN. In step 630, it is determined whether a selectable cell of an area where the current mobile communication terminal is located exists. When no selectable cell exists in step 630, the cell initialization search process is re-performed in step 625. When the selectable cell exists as n step 630, information about the selected PLMN and cell is stored in step 635.

When a plurality of PLMNs is searched for in step 610, the above-described operations, whose number corresponds to the number of searched PLMNs, are performed so that information about the plurality of PLMNs and a plurality of cells thereof is stored.

Figure 7:
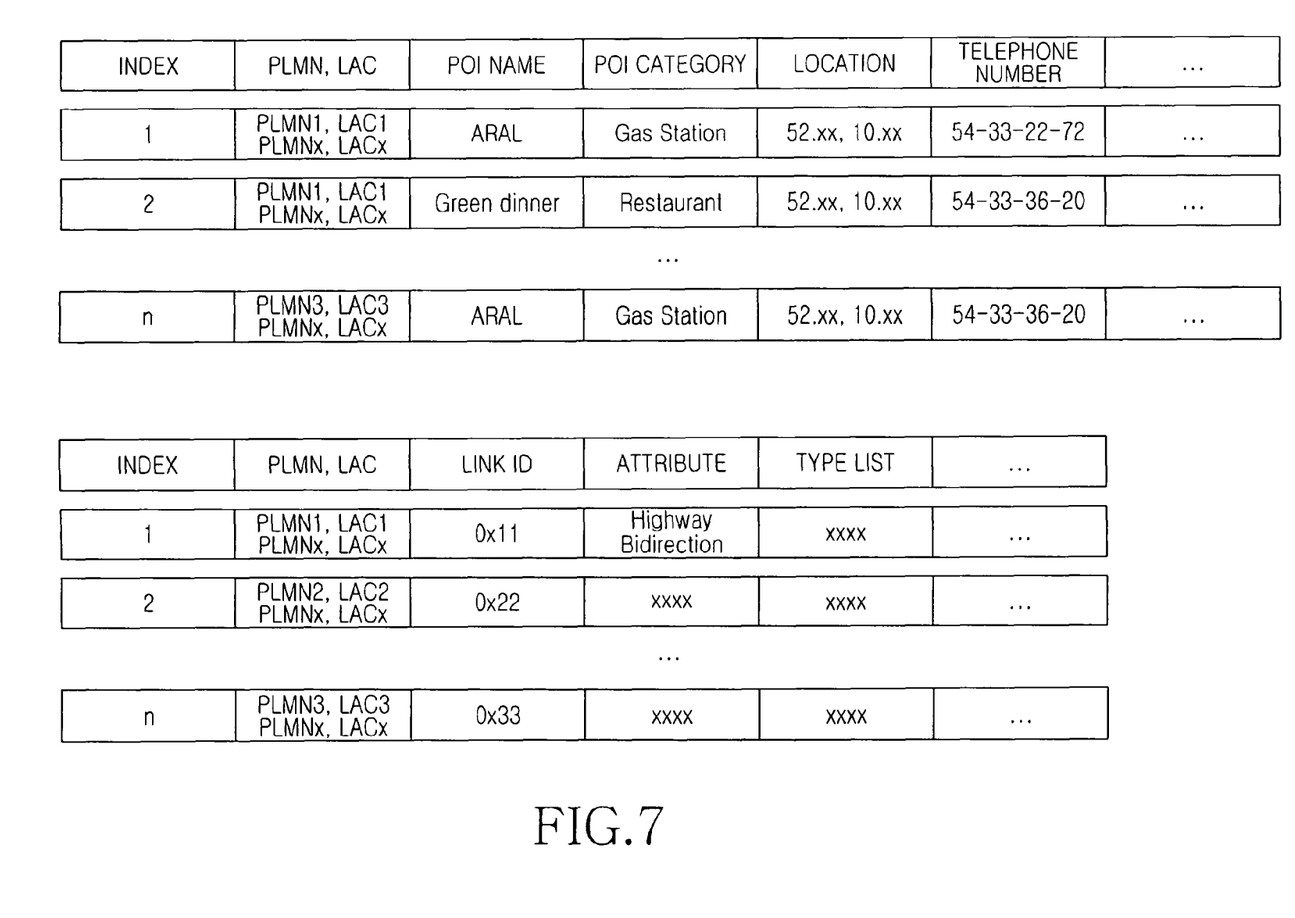
FIG. 7 illustrates a structure of a map database according to an exemplary embodiment of the present invention.

FIG. 7 illustrates a structure of a map database according to an exemplary embodiment of the present invention. The map database according to the exemplary embodiment of the present invention includes an index field, a point of interest (POI) name field, a POI category field, a location field, a telephone number field, a link ID field, an attribute field, and a type list field, and further includes a PLMN/LAC field according to a feature of the present invention. Location information of each POI can be computed using a PLMN/LAC field for each POI.

Figure 8:
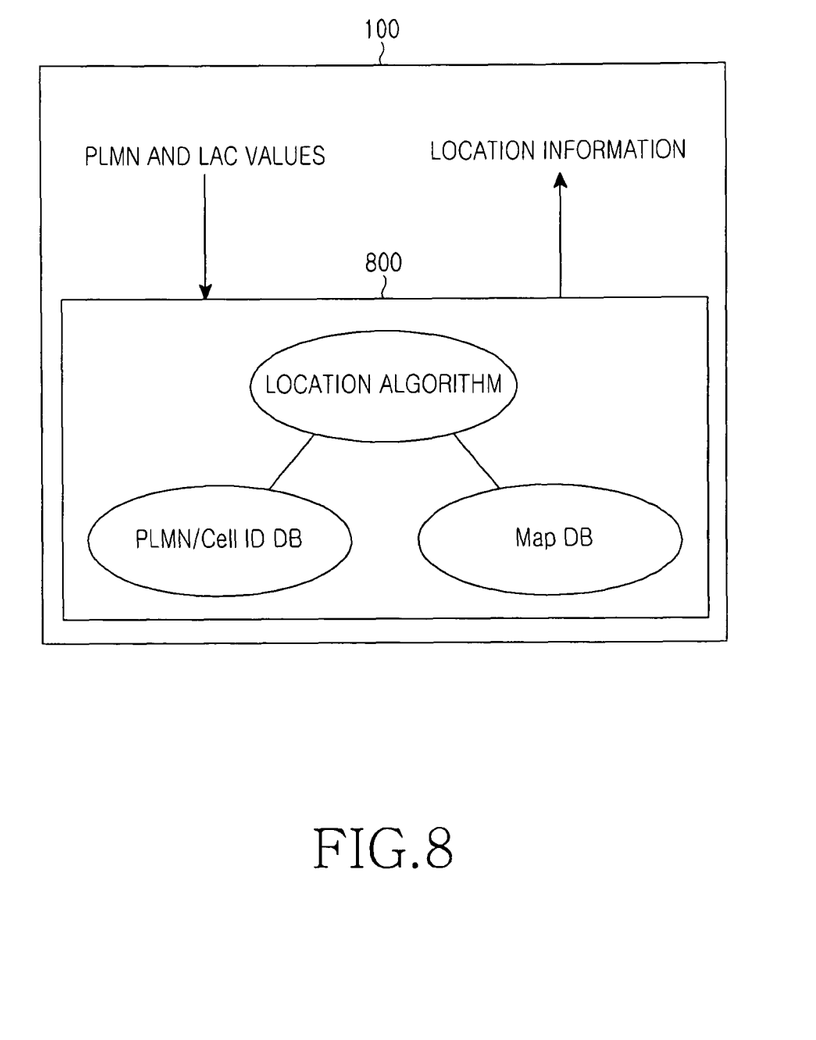
FIG. 8 illustrates a block diagram for an internal structure of the terminal for location detection according to an exemplary embodiment of the present invention.
Figure 9:
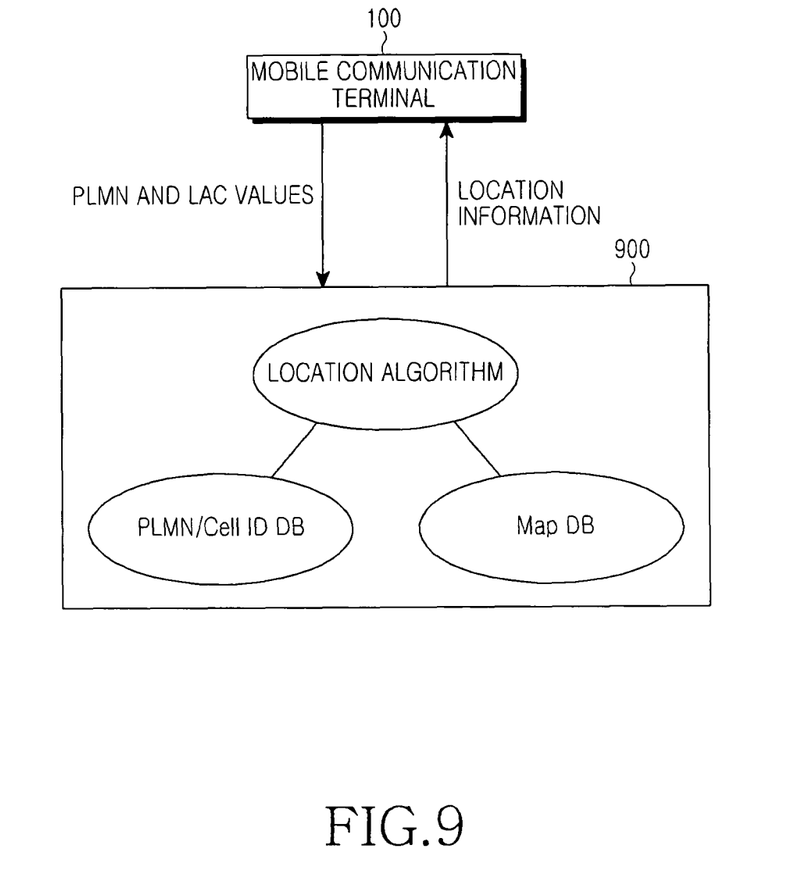
FIG. 9 illustrates a block diagram for an external server separately implemented for the location detection structure according to an exemplary embodiment of the present invention.

FIG. 8 illustrates a block diagram for an internal structure of the terminal for location detection according to an exemplary embodiment of the present invention. FIG. 9 illustrates a block diagram for an external server separately implemented for the location detection structure according to an exemplary embodiment of the present invention. As illustrated in FIG. 8, the location detection structure according to the exemplary embodiment of the present invention includes a location computing unit 800 having a PLMN/cell ID database and a map database inside the terminal 100, thereby exactly measuring and detecting location information of the terminal 100 to which a plurality of PLMN values and a plurality of LAC values are input. As illustrated in FIG. 9, the external server includes a location computing unit 900 that can have a PLMN/cell ID database and a map database, receive PLMN and LAC values from the terminal 100, and measure and output terminal location information.

According to the above-described exemplary embodiments of the present invention, a location detection method and apparatus of a mobile communication terminal can be operated and configured.

According to an exemplary embodiment of the present invention, a mobile communication terminal can acquire its own location information in a more precise range than that of a conventional technology by searching for a plurality of PLMNs whose information is included in a BCCH and utilizing and storing unregistered PLMN and cell IDs except registered PLMN and cell IDs, when a location is detected using information about a cell where the mobile communication terminal is located.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for detecting a location of a mobile communication terminal, comprising:
   setting a mobile communication network for communication with the mobile communication terminal and a cell identifier (ID) of a base station and storing a public land mobile network (PLMN) ID of the mobile communication network and the cell ID;
   searching for one or more mobile communication networks other than the set mobile communication network;

sequentially setting, when the one or more other mobile communication networks are searched for, the searched one or more other mobile communication networks, searching for cell information according to the set one or more other mobile communication networks, setting cell IDs of base stations communicable with the mobile communication terminal, and storing PLMN IDs of the set one or more other mobile communication networks and the set cell IDs; and determining a common area between areas of a plurality of cells set using the stored PLMN ID and cell IDs and detecting information about the common area as location information of the mobile communication terminal.

2. The method of claim 1, wherein searching for one or more mobile communication networks other than the set mobile communication network includes:

searching for a plurality of PLMN IDs included in a broadcasting channel (BCCH).

3. The method of claim 2, wherein the BCCH includes a mobile country code (MCC), a mobile network code (MNC), a location area code (LAC), and a routing area code (RAC), and the PLMN IDs are determined as values of the MCC and MNC.

4. The method of claim 3, wherein the cell ID is an LAC value.

5. The method of claim 1, wherein when the one or more other mobile communication networks are not searched for, the one or more other mobile communication networks are repeatedly searched for in a preset period.

6. The method of claim 1, wherein setting the searched one or more other mobile communication networks and searching for the cell information according to the set one or more other mobile communication networks include:

performing a cell initialization search process according to the one or more other mobile communication networks.

7. A system for detecting a location of a mobile communication terminal, the system comprising:

the mobile communication terminal configured to set a mobile communication network for communication and a cell ID of a base station, store a public land mobile network identifier (PLMN ID) of the mobile communication network and the cell ID, search for one or more mobile communication networks other than the set mobile communication network, sequentially set, when the one or more other mobile communication networks are searched for, the searched one or more other mobile communication networks, search for cell information according to the set one or more other mobile communication networks, set cell IDs of base stations communicable with the mobile communication terminal, and store PLMN IDs of the set one or more other mobile communication networks and the set cell IDs; and a location computing unit configured to receive the stored PLMN ID and cell IDs from the mobile communication terminal, determine a common area between areas of a plurality of cells set using the stored PLMN ID and cell IDs, and detect information about the common area as location information of the mobile communication terminal.

8. The system of claim 7, wherein when the one or more mobile communication networks other than the set mobile communication network are searched for, the mobile terminal is configured to search for a plurality of PLMN IDs included in a BCCH.

9. The system of claim 8, wherein the BCCH includes a mobile country code (MCC), a mobile network code (MNC), a location area code (LAC), and a routing area code (RAC) and the PLMN IDs are determined as values of the MCC and MNC.

10. The system of claim 9, wherein the cell ID is an LAC value.

11. The system of claim 7, wherein when the one or more other mobile communication networks are not searched for, the mobile communication terminal is configured to repeatedly search for the one or more other mobile communication networks in a preset period.

12. The system of claim 7, wherein when the searched one or more other mobile communication networks are set up and the cell information according to the set one or more other mobile communication networks are searched for, a cell initialization search process is performed according to the one or more other mobile communication networks.

13. The system of claim 7, wherein the location computing unit includes a database for PLMN and cell IDs and a map database.

14. The system of claim 13, wherein the location computing unit is one of a location computing unit provided in the mobile communication terminal and a location computing unit provided in an external server outside the mobile communication terminal.

* * * * *